(12) United States Patent
Buckley et al.

(10) Patent No.: US 8,090,830 B2
(45) Date of Patent: Jan. 3, 2012

(54) APPARATUS, AND ASSOCIATED METHOD, FOR GENERATING AND TRANSMITTING AN ANONYMOUS ROUTING IDENTIFIER TO IDENTIFY USER AGENT

(75) Inventors: Adrian Buckley, Tracy, CA (US); Andrew Allen, Mundelein, IL (US)

(73) Assignee: Research In Motion Limited, Waterloo (CA)

( * ) Notice: Subject to any disclaimer, the term of this patent is extended or adjusted under 35 U.S.C. 154(b) by 1269 days.

(21) Appl. No.: 11/416,465

(22) Filed: May 2, 2006

(65) Prior Publication Data

US 2007/0260739 A1 Nov. 8, 2007

(51) Int. Cl.
*G06F 15/173* (2006.01)
(52) U.S. Cl. ........................ 709/226; 709/246
(58) Field of Classification Search .................. 709/226, 709/246
See application file for complete search history.

(56) References Cited

U.S. PATENT DOCUMENTS

| | | | | |
|---|---|---|---|---|
| 7,466,810 B1 * | 12/2008 | Quon et al. | .............. | 379/201.01 |
| 7,583,685 B2 * | 9/2009 | Ajitomi et al. | ................ | 370/401 |
| 2005/0276268 A1 * | 12/2005 | Poikselka et al. | .......... | 370/395.2 |
| 2006/0018272 A1 | 1/2006 | Mutikainen | | |
| 2006/0126556 A1 * | 6/2006 | Jiang et al. | ..................... | 370/328 |
| 2006/0133392 A1 * | 6/2006 | Ajitomi et al. | ................ | 370/401 |
| 2006/0235981 A1 * | 10/2006 | Westman et al. | ............. | 709/227 |
| 2007/0002831 A1 * | 1/2007 | Allen et al. | .................... | 370/352 |
| 2007/0157247 A1 * | 7/2007 | Cordray et al. | ................ | 725/47 |

OTHER PUBLICATIONS

J. Rosenberg, Identity Privacy in the Session Initiation Protocol (SIP), Jul. 11, 2005, Cisco Systems, pp. 1-16.*
Rosenberg Cisco Systems C Jennings Cisco J Peterson Neustar J: "Identity Privacy in the Session Initation Protocol (SIP); draft-rosenberg-sip-identity-privacy-00.txt", IETF Standard-Working-Draft, Internet Engineering Task Force, IETF, CH, Jul. 11, 2005, pp. 1-16.
Rosenberg Cisco Systems J: "Obtaining and Using Globally Routable User Agent (UA) URIs (GRUU) in the Session Initiation Protocol (SIP); draft-ietf-sip-gruu-06.txt" IETF Standard-Working-Draft, Internet Engineering Task Force, IETF, Ch, vol. sip, No. 6, Oct. 20, 2005, pp.
Peterson Neustar J; "A Privacy mechanism for the Session Initiation Protocol (SIP); draft-peterson-sip-privacy-longterm-00.txt;" IETF Standard-Working-Draft, Internet Engineering Task Force, IETF, Ch, Mar. 2002, pp. 1-26.
Rosenberg Cisco Systems C Jennings Cisco J Peterson Neustar J: "Identity Privacy in the Session Initiation Protocol (SIP); draft-rosenberg-sip-identity-privacy-00.txt"; IEFT Standard-Working-Draft, Internet Engineering Task Force, IEFT, CH, Jul. 11, 2005, pp. 1-16, XP015040195.

* cited by examiner

*Primary Examiner* — Liangche A Wang (57) ABSTRACT

Apparatus, and an associated method, for generating and transmitting an anonymous GRUU, or other routing identifier, to identify a user agent in a communication system that utilizes SIP signaling. A user agent-generated message is generated that identifies a user agent-request for anonymous operation. And, a SIP registrar, or other network device, operates to provide an anonymous routing identifier that permits anonymous operation of the user agent to maintain privacy of its identity during communications.

38 Claims, 8 Drawing Sheets

```
46

SIP/2.0 200 OK
Via: SIP/2.0/UDP 192.0.2.1;branch=z9hG4bKnashds7
From: Callee <sip:callee@example.com>;tag=a73kszlfl
To: Callee <sip:callee@example.com> ;tag=b88sn
Call-ID: 1j9FpLxk3uxtm8tn@192.0.2.1
CSeq: 1 REGISTER
Service-Route: <sip:s-cscf1.example.com;lr>
<allOneLine>
54 ~ Contact: <sip:callee@192.0.2.1>
     ;gruu="sip:callee@example.com;gruu;
56 ~ opaque=urn:uuid:f81d4fae-7dec-11d0-a765-00a0c91e6bf6"
58 ~ ;agruu="sip:anonymous@example.com;agruu;
     opaque=urn:euid:5d47d1e1e1d410eda038faf6ba76c90f7d15ef80e7014ea2316
64 ~ base-alg=11;rand-alg=2;"     \62
     ;+sip.instance="<urn:uuid:f81d4fae-7dec-11d0-a765-00a0c91e6bf6>"
     ;expires=3600       66
     </allOneLine>
     Content-Length: 0
```

```
REGISTER sip:example.com SIP/2.0
Via: SIP/2.0/UDP 192.0.2.1;branch=z9hG4bKnashds7
Max-Forwards: 70
From: Callee <sip:callee@example.com>;tag=a73kszlfl
Supported: gruu, agruu    48
To: Callee <sip:callee@example.com>
Call-ID: 1j9FpLxk3uxtm8tn@192.0.2.1
CSeq: 1 REGISTER
Contact: <sip:callee@192.0.2.1>
;+sip.instance="<urn:uuid:f81d4fae-7dec-11d0-a765-00a0c91e6bf6>"
Content-Length: 0
```

```
SIP/2.0 200 OK
Via: SIP/2.0/UDP 192.0.2.1;branch=z9hG4bKnashds7
From: Callee <sip:callee@example.com>;tag=a73kszlfl
To: Callee <sip:callee@example.com> ;tag=b88sn
Call-ID: 1j9FpLxk3uxtm8tn@192.0.2.1
CSeq: 1 REGISTER
Service-Route: <sip:s-cscf1.example.com;lr>
<allOneLine>
Contact: <sip:callee@192.0.2.1>
;gruu="sip:callee@example.com;gruu;
opaque=urn:uuid:f81d4fae-7dec-11d0-a765-00a0c91e6bf6"
;agruu="sip:anonymous@example.com;agruu;
opaque=urn:euid:5d47d1e1e1d410eda038faf6ba76c90f7d15ef80e7014ea2316
base-alg=11;rand-alg=2;"      62
;+sip.instance="<urn:uuid:f81d4fae-7dec-11d0-a765-00a0c91e6bf6>"
;expires=3600                 66
</allOneLine>
Content-Length: 0
```

54 → Contact
56 → opaque
58 → ;agruu
64 → base-alg

```
INVITE   .sip:callee.example.com SIP/2.0
From: Anonymous <sip:anonymous@example.com>;tag=n88ah
To: Callee <sip:callee@example.com>
Route: <sip: s-cscf1.example.com;lr>
Max-Forwards: 70
Call-ID: 1j9FpLxk3uxtma7@host.example.com
CSeq: 1 INVITE
Supported: gruu; agruu  ~78
Allow: INVITE, OPTIONS, CANCEL, BYE, ACK
<allOneLine>
Contact:
<sip:anonymous@example.com;gruu;agruu  ~82
;opaque=
urn:euid:5d47d1e1e1d410eda038faf6ba76c90f7d15ef80e7014ea2316;
grid=99a;local-tag= n88ah;base-alg=11;rand-alg=2>
</allOneLine>      88         92          94
Content-Length: --
Content-Type: application/sdp
```

84 — ;opaque=
86 — grid=99a;local-tag=

```
SIP/2.0 200 OK
Via: SIP/2.0/UDP proxy.example.com;branch=z9hG4bKnaa8
Via: SIP/2.0/UDP host.example.com;branch=z9hG4bK99a
From: Anonymous <sip:anonymous@example.com>;tag=n88ah
To: Callee <sip:callee@example.com> ;tag=a0z8
Call-ID: 1j9FpLxk3uxtma7@host.example.com
CSeq: 1 INVITE
Supported: gruu; agruu  ~102
Allow: INVITE, OPTIONS, CANCEL, BYE, ACK
<allOneLine>
Contact:
<sip:anonymous@example.com;gruu;agruu
;opaque=            106
urn:euid:5d47d1e1e1d410eda038faf6ba76c90f7d15ef80e7014ea2316;
grid=99a;remote-tag= a0z8;base-alg=11;rand-alg=2>
</allOneLine>      112      114        116
Content-Length: --
Content-Type: application/sdp
```

104 — ;opaque=
108 — grid=99a;remote-tag=

```
<allOneLine>
REFER   . sip:anonymous@example.com;gruu;agruu
  ;opaque= urn:euid:
eda038faf6ba765d47d1e1e1d410c90f7d15ef80e7014ea2316;
grid=36a789a;remote-tag= a0z8;base-alg=11;rand-alg=2 SIP/2.0
</allOneLine>
From: Anonymous <sip:anonymous@example.com>;tag=a56781
To: Anonymous <sip:anonymous@example.com>
Max-Forwards: 70
Call-ID: 1j9FpLxk3uxtma7@host.example.com
CSeq: 2 REFER
Supported: gruu
Allow: INVITE, OPTIONS, CANCEL, BYE, ACK
<allOneLine>
Refer-To: <sip:anonymous@example.com;gruu;agruu
  ;opaque= urn:euid:5d47d1e1e1ef80e701038faf6ba76c90f7d 4ea2316;
 grid=99a;local-tag= n88ah;base-alg=11;rand-alg=2>
Contact:
<sip:anonymous@example.com;gruu;agruu
  ;opaque=         126
urn:euid:50e7014ea2347d1e1e1d410eda038faf6ba76c90f7d15ef816;
grid=9389b;local-tag= a56781;base-alg=11;rand-alg=2>
</allOneLine>         132      134        136
Content-Length: 0
```

124 → ;opaque=
128 → grid=9389b
132 → local-tag= a56781
134 → base-alg=11
136 → rand-alg=2

```
INVITE tel:+1-212-555-3333 SIP/2.0
Via: SIP/2.0/UDP [5555::aaa:bbb:ccc:ddd] :1357; comp=sigcomp;
branch=z9hG4bKnashds7
Max-Forwards: 70
Route: sip:pcscf1.home1.net:7531; lr; comp=sigcomp>,
<sip:orig@scscf1.home1.net;lr>
P-Asserted-Identity: "John Doe" <sip:user1_public1@home1.net>
P-Access-Network-Info: 3GPP-UTRAN-TDD; utran-cell-id-3gpp=234151D0FCE11
Privacy: Critical
From: <anonymous>; tag=171828                                          156
To: <tel:+1-212-555-3333>
Call-ID: cb03a0s09a2sdfglkj490333
Cseq: 127 INVITE
Supported: 100rel; precondition; agruu
Require: sec-agree
Proxy-Require: sec-agree
Security-Verify: ipsec-3gpp; q=0.1; alg=hmac-sha-1-96; spi=87654321;
port1=7531
Contact: < sip:hfdshguesr98gn.scscf1.home1.net@home.net;gruu; agruu;    158
opaque=urn:uuid:f81d4fae-7dec-11d0-a765-00a0c91e6bf6; grid=99a;base-    162
alg=11;rand-alg=2>
Allow: INVITE, ACK, CANCEL, BYE, PRACK, UPDATE
Content-Type: application/sdp
Content-Length:   (...)

v=0
o=- 2987933615  2987933615  IN  IP6  5555::aaa:bbb:ccc:ddd
s=-
c=IN IP6 5555::aaa:bbb:ccc:ddd
t=0 0
m=audio 3456 RTP/AVP 97 96
b=AS:25.4
a=curr:qos local none
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone=event
a=maxptime:20
```

```
INVITE sip:hfdshgesr98gn.scscf1.home1.net@home1.net; gruu; agruu;
opaque=urn:euid:
5d47d1e1e1d410eda038faf6ba76c90f; grid=99a:base-alg=11;rand-alg=2 SIP/2.0
Via: SIP/2.0/UDP [5555::aaa:bbb:ccc:ddd] :1357; comp=sigcomp;
branch=z9hG4bKnashds7
Max-Forwards: 70
Route:   sip:pcscf1.home2.net:7531; lr; comp=sigcomp>,
<sip:orig@scscf1.home2.net;lr>
P-Asserted-Identity: "Andrew Allen" <Uip:user1_public1@home2.net>
P-Access-Network-Info: 3GPP-UTRAN-TDD; utran-cell-id-3gpp=234151D0FCE11
Privacy: none
From: <sip:user1_public1@home2.net>; tag=171828
To: <tel:+1-212-555-3333>
Call-ID: cb93a0s09a9sdfg9kj490456
Cseq: 127 INVITE
Supported: 100rel; precondition; gruu; agruu
Require: sec-agree
Proxy-Require: sec-agree
Security-Verify: ipsec-3gpp; q=0.1; alg=hmac-sha-1-96; spi=87654321;
port1=7531
Contact: <tel:+1-212-555-3333>
Allow: INVITE, ACK, CANCEL, BYE, PRACK, UPDATE
Content-Type: application/sdp
Content-Length:   (...)

v=0
o=- 2987933615  2987933615  IN  IP6   5555::aaa:bbb:ccc:ddd
s=-
c=IN IP6 5555::aaa:bbb:ccc:ddd
t=0 0
m=audio 3456 RTP/AVP 97 96
b=AS:25.4
a=curr:qos local none
a=curr:qos remote none
a=des:qos mandatory local sendrecv
a=des:qos none remote sendrecv
a=rtpmap:97 AMR
a=fmtp:97 mode-set=0,2,5,7; mode-change-period=2
a=rtpmap:96 telephone=event
a=maxptime:20
```

APPARATUS, AND ASSOCIATED METHOD, FOR GENERATING AND TRANSMITTING AN ANONYMOUS ROUTING IDENTIFIER TO IDENTIFY USER AGENT

The present invention relates generally to communications in a communication system that utilizes session initiation protocol signaling between user agents that are to be parties to a communication dialog. More particularly, the present invention relates to apparatus, and an associated method, for generating and transmitting an anonymous GRUU (Globally Routable User agent URI), or other identifier, provided to a user agent pursuant to a communication dialog. By providing and using an anonymous identifier, the identity of the user agent is not made known to a third party, or other, agent.

BACKGROUND OF THE INVENTION

Advancements in digital communication technologies have permitted the development and deployment of many new types of communication devices. Communication systems in which communication devices are operable provide for the communication of data between sets of the communication devices. To ensure that operability of a communication device in a communication system, operating protocols and requirements are sometimes standardized, such as by a standard-setting body, and operation of a communication device in compliance with the operating standard ensures its operability with other communication devices that also operate in compliance with the standard.

Signaling protocols are regularly enumerated in such standards. Signaling protocols are used to set up communications between a set of communication devices to permit performance of a subsequent communication session. An SIP (Session Initiation Protocol) is an exemplary signaling protocol that is used pursuant to call set-up in IP (Internet Protocol)-based, and other packet data, communication schemes. Communication devices connectable to a packet data backbone, such as the Internet, that utilize SIP include, e.g., so-called, SIP phones. Such devices are peer-to-peer devices as they are capable of direct communications by way of the communication network without requiring that the communication network provide functionality other than, e.g., communication and routing of communication data.

The RFC 3261, for instance, sets forth operational requirements of the SIP pursuant to an establishment and maintenance of a dialog between a set of user agents. Typically, messages generated and communicated pursuant to the dialog between the user agents are communicated there between using a series of proxy hops through successive logical entities of the data network. The series of proxy hops is sometimes referred to as a route set. Messages are delivered to a user agent subsequent to the successive hops through the network. SIP messages include header parts having various header fields including, for instance, a contact header field. The RFC 3261 requires that the contact header fields of certain SIP messages to include URIs (Uniform Resource Identifiers) that are global. That is to say, the URIs must be able to be used at any element connected to the network. The RFC 3261 also mandates that the URIs be valid for requests sent outside of the dialog in which the contact URI is inserted. Exemplary SIP messages that include contact header fields populated with URIs include invite requests, register requests, and refer requests.

An IETF (Internet Engineering Task Force) draft standard proposal, the draft-IETF-SIP-GRUU, defines a type of URI, referred to as a globally routable user agent URI (GRUU).

The GRUU has properties pertaining to routing to a user (Address of record) at a unique user agent and of being reachable from anywhere. Additionally, a new mechanism is defined in the draft standard by which an SIP user agent is able to obtain a GRUU from a SIP registrar of an SIP provider pursuant to registration. This mechanism thereby permits the URI to be used in the contact header fields of dialog-forming requests and responses in order to communicate the GRUU to other SIP user agents. Because a GRUU is provided by a user's SIP provider, the GRUU properties can be guaranteed by the provider. And, as a result, another SIP user agent is able to insert the GRUU in the request-URI of a SIP request targeted at the same specific AOR at a unique user agent instance in order to enable various applications, which require the GRUU property, including transfer and conferencing applications, to work reliably.

Existing schemes and protocols, however, fail to provide for user agent anonymity. For instance, when a call, i.e., a dialog, is established between a first user agent and a second user agent, and the call is to be transferred from the second user agent to a third user agent, the identity of the GRUU of the first user agent is ascertainable by the third user agent.

A mechanism is therefore required that provides for the creation of a GRUU that provides for persistence and provides a globally routable property but that also provides for anonymity.

It is in light of this background information related to SIP signaling and communications utilizing SIP that the significant improvements of the present invention have evolved.

DETAILED DESCRIPTION

The present invention, accordingly, advantageously provides apparatus, and an associated method, by which to communicate in a communication system that utilizes SIP (Session Initiation Protocol) signaling between user agents that are parties to a communication dialog.

Through operation of an embodiment of the present invention, a manner is provided for generating and transmitting an anonymous GRUU (Globally Routable User agent URI), or other identifier, provided to a user agent pursuant to a communication dialog.

In one aspect of the present invention, through the use of an anonymous identifier, the identity of a user agent is not made known to a third party, such as a call, or other, agent. And, thereby, the anonymity of the user agent is preserved. In the event, for example, of a call transfer, the user agent to which a call is transferred is not made aware of the actual identity of the other user agent forming a party to the call.

In another aspect of the present invention, a user agent generates an SIP message that includes a field populated with a value identifying the user agent to be anonymous-identifier capable. The field of the message is populated, for instance, with an identification of an AGRUU (Anonymous Globally Routable User agent URI). By including such a field and populating the field with the flag or value, the message alerts a recipient of the capability of the user agent to be operable to utilize the AGRUU, or other anonymous identifier. It also notifies a SIP registrar that an AGRUU is requested.

The message header field forms, for instance, a contact header field that includes the AGRUU-capable indication. The contact header field forms part of register request, register response, invite, 200 ok, refer, and other SIP messages. More generally, the value populating the field forms a textual string including one or more alphanumeric characters.

In another aspect of the present invention, a network device, such as an SIP registrar, receives the message generated by the user agent and is able to act thereon. The network device detects the value populating the field of the message, such as the contact header or "supported" field part of the message. And, the network device generates a register response for return to the user agent. In addition to information conventionally included in the register response, the network device includes a contact field that includes a value of the anonymous AGRUU for the user agent that sent the register request. The value of the AGRUU forms, for instance, a textual string of alphanumeric characters.

The register response, a 200 ok message, or other type of response message, also includes additional values, such as values of a RAND-ALG (randomizer algorithm) a BASE-ALG (base algorithm), an encrypted UID, and selectively, an encrypted AOR (address of record) value.

The user agent that receives the register response makes use of the values, i.e., text strings, of the contact header field of the register response message.

In another aspect of the present invention, a user agent also includes apparatus for generating additional messages, making use of the values contained in the response message provided to the user agent in response to a register request message. An exemplary such message includes a SIP invite message. The SIP invite message includes a supported field string identifying support of the user agent of an AGRUU or another textual string that indicates the support of anonymous GRUU. And, the invite message also includes a contact header field that includes a field identifying the AGRUU of the user agent. The invite message selectably further includes an encrypted UID value. The UID value is encrypted, for instance, using a key of a value known to the user agent. The key is based, for instance, on the IP, IMSI, a GPS location indication, a time of day indication, combinations thereof, as well as other values or their combinations known to their user agent. Other fields are also included such as Base ALG and RAND ALG that identify encryption keys that have been used to generate the Anonymous GRUU.

The user agent is able to generate other messages, including, for instance, a refer or transfer message. Such other messages also include contact header fields populated with strings of textual data analogous to that just-described.

Generally, pursuant to operation of an embodiment of the present invention, a message is generated, or received, with a supported field. Pursuant to generation of a message, the message is populated with an AGRUU, or another analogous value, in a supported field to identify support of AGRUU. And, a contact field is formed that includes a value of an AGRUU, or the like, and, selectively, also an encrypted UID value (EUID) and Base ALG and RAND ALG that identify encryption keys that have been used to generate the Anonymous GRUU. Support fields, contact fields, R-URI, and to: fields are all provided and utilized pursuant to an embodiment of the present invention and may contain these parameters as well.

In another aspect of the present invention, a manner is provided that provides for anonymity of a user agent. When, for instance, a dialog between the user agent and another party is transferred from that party to a subsequent party, the subsequent party is unable to obtain the identity of the user agent, due to its anonymity.

In these and other aspects, therefore, apparatus, and an associated method, is provided for a communication device operable pursuant to a session interface protocol. The apparatus facilitates use of a globally routable identifier while maintaining anonymity of the communication device. A message generator is configured to generate an SIP message. The message is populated with values indicating at least support of the communication device for a public globally routable identifier and an anonymous globally routable identifier. A response message detector is also provided that operates to detect a response message generated in response to the message generated by the message generator.

Figure 1:
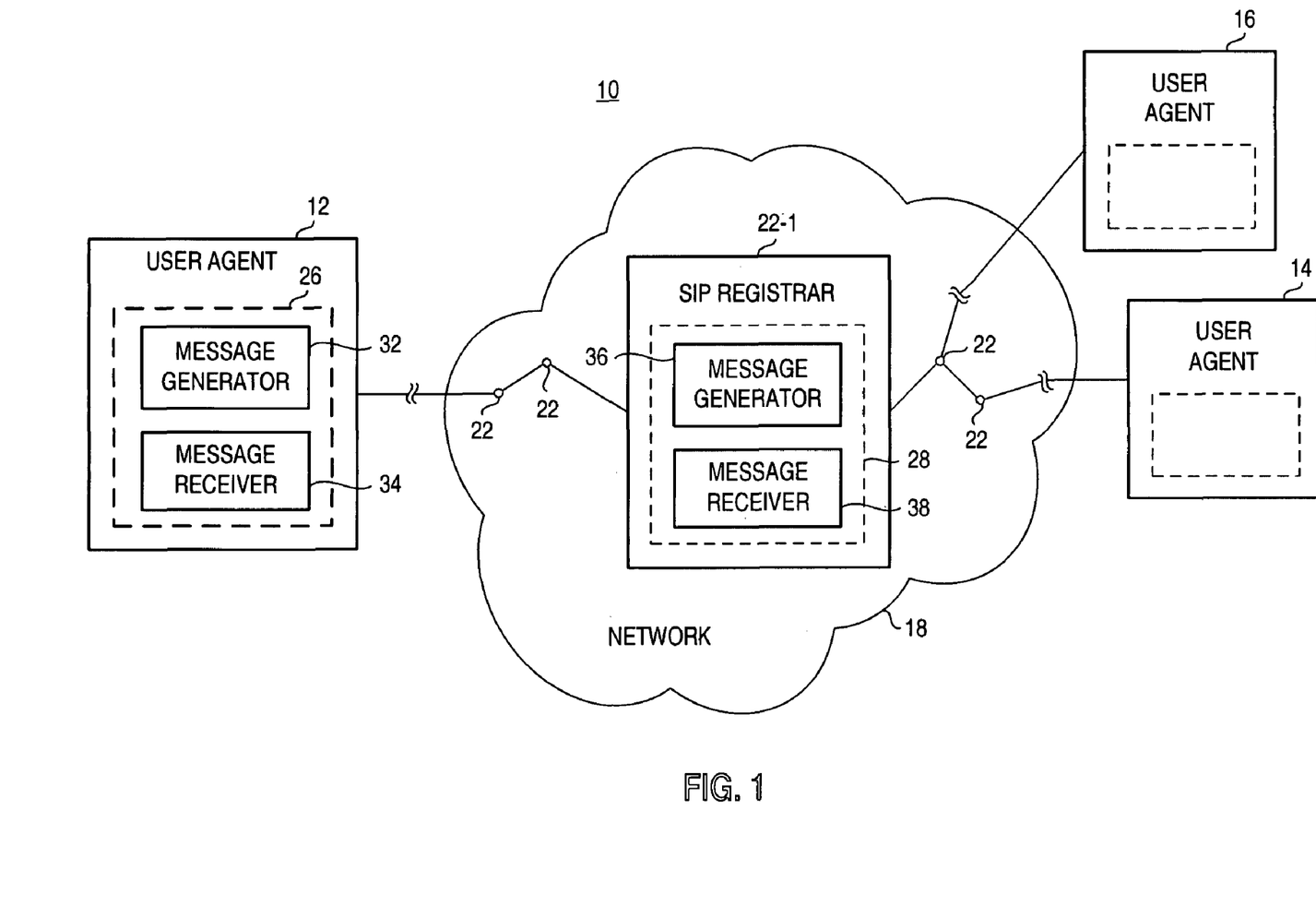
FIG. 1 illustrates a functional block diagram of a communication system in which an embodiment of the present invention is operable.

Referring first, therefore, to FIG. 1, a communication system, shown generally at 10, provides for SIP-based (Session Initiation Protocol-based) communications between user agents, of which the user agents 12, 14, and 16 are representative. In a typical communication system, a large number of user agents, e.g., SIP phones, are connected to a communication fabric, i.e., network, here forming a packet data network 18. When a user comprises a mobile station, the network 18 is further representative of a radio access network.

The network 18 includes a plurality of entities, here generically referred to as nodes 22. The nodes are of any functional and physical entities, each typically identified by an address, such as an IP (Internet Protocol) address. Communications effectuated between a set of user agents is carried out by routing data packets that contain the data through successive ones of the nodes. The nodes form proxies, and the communication of the data between successive proxies formed of the nodes are sometimes referred to as proxy hops. The collection of proxy hops between the user agents is sometimes referred to as a route set.

Pursuant to conventional, SIP operation, a dialog is established between user agents responsive to completion of call set-up procedures. The call set-up procedures include exchange of signaling messages between devices of the communication system. A SIP registrar 22-1 is amongst the functional entities of the packet data network, comprising, or forming a portion of, a node device of the network. The SIP registrar is operable, amongst other things, in conjunction with the exchange of signaling messages carried out during call set-up between a set of user agents. In the exemplary representation of the figure, both the user agents 12, 14, and 16 and the SIP registrar 22-1 contain apparatus of an embodiment of the present invention.

Apparatus 26 is embodied at the user agent, and apparatus 28 is embodied at the SIP registrar. In other implementations, the apparatus and functionalities of such apparatus is implemented elsewhere in the communication system. The elements of the apparatus 26 and 28 are also functionally represented, implementable in any desired manner, including software executed by algorithms, hardware devices, and combinations thereof. Through operation of the apparatus and the methodologies carried out, improved privacy of communications is provided. Conventional implementations, in contrast, fail to ensure the anonymity of a user agent, and, hence, its user when, e.g., a call, i.e., a dialog, of a user agent is transferred from one called party to another called party.

The apparatus 26 and 28 are each operable, in the exemplary implementation, to generate SIP messages and to receive SIP messages that are constructed in manners that facilitate the anonymity of operation of the user agent. The apparatus 26, includes a message generator 32 and a message receiver 34. Others of the user agents include corresponding elements. And, the apparatus 28 embodied at the SIP registrar 22-1 includes a message generator 36 and a message receiver 38. Messages generated by the respective message generators include any conventional, SIP message, such as a register request, a register reply, e.g., a 200 ok message, an invite message, and a refer message. Details of the general formats of such messages are in general conformity with existing protocols.

When a dialog, i.e., a call or communication session, is to be established, the user agent must first be registered. To become registered, the user agent generates and sends a register request message.

Figure 2:
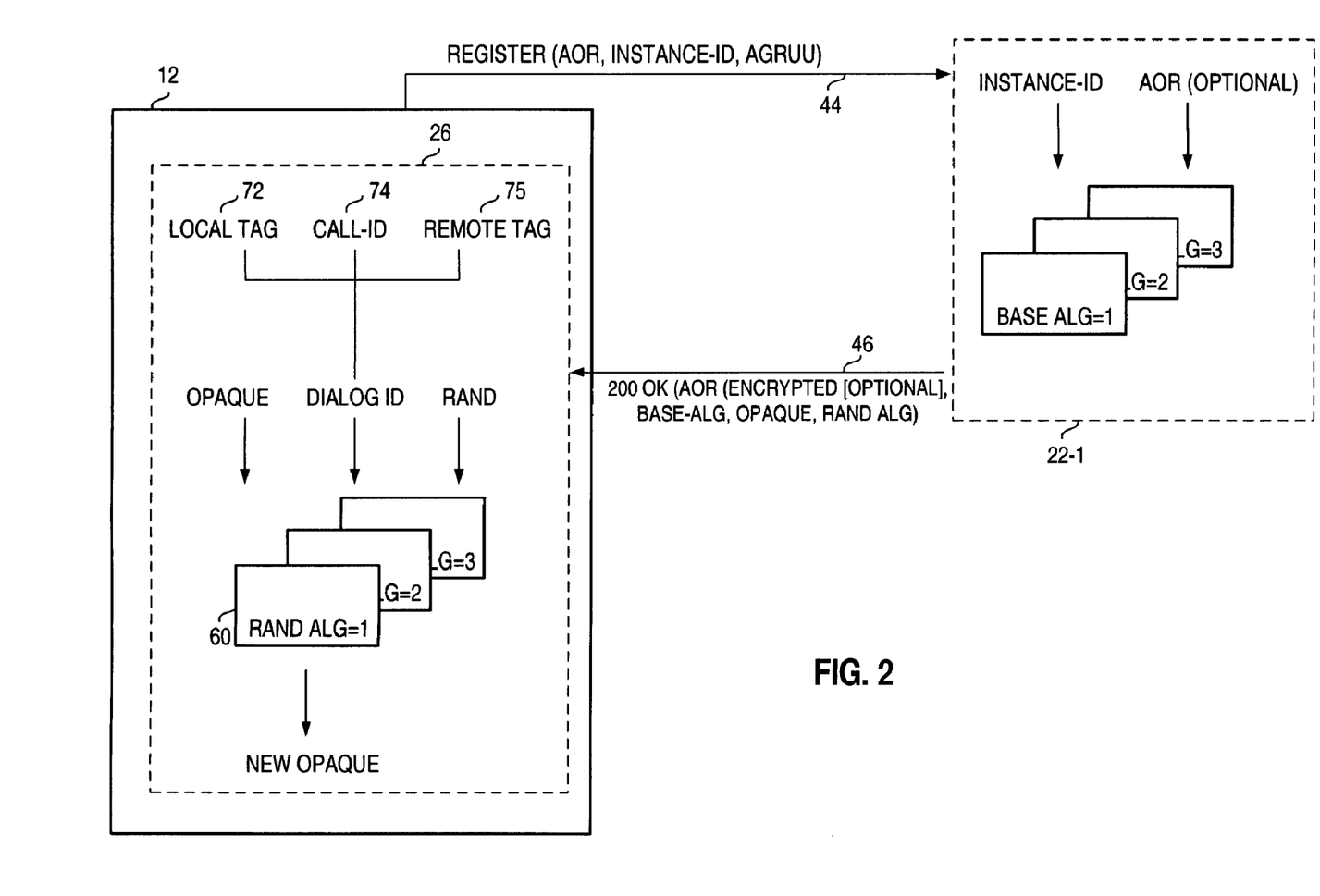
FIG. 2 illustrates a message sequence diagram representative of exemplary signaling generated during operation of the communication system shown in FIG. 1.

FIG. 2 illustrates an exemplary exchange of messages between the user agent 12 and the SIP register 22-1 pursuant to registration of the user agent through the generation, by the message generator 32 of a register request. In FIG. 2, the register request is indicated by the segment 44, here generated by the user agent 26 for delivery to the SIP registrar 22-1. The register request, as indicated by the segment 44, includes an AOR (address of record), an instance-ID, and an AGRUU (anonymous globally routable user agent URI)-capable indication. The message receiver of the SIP registrar detects the transmitted message, and the message generator thereof generates a message response, here a 200 ok message, indicated by the segment 46 for reply to the user agent. The 200 ok message, as indicated in FIG. 2, includes an AOR value that is optionally encrypted, a base-algorithm, an opaque value, and a RAND algorithm value. The base algorithm identifies the encryption scheme used to create the EUID and the RAND identifies the algorithm that the SIP UA should use to randomize it further if it sees fit to choose so.

Figure 3:
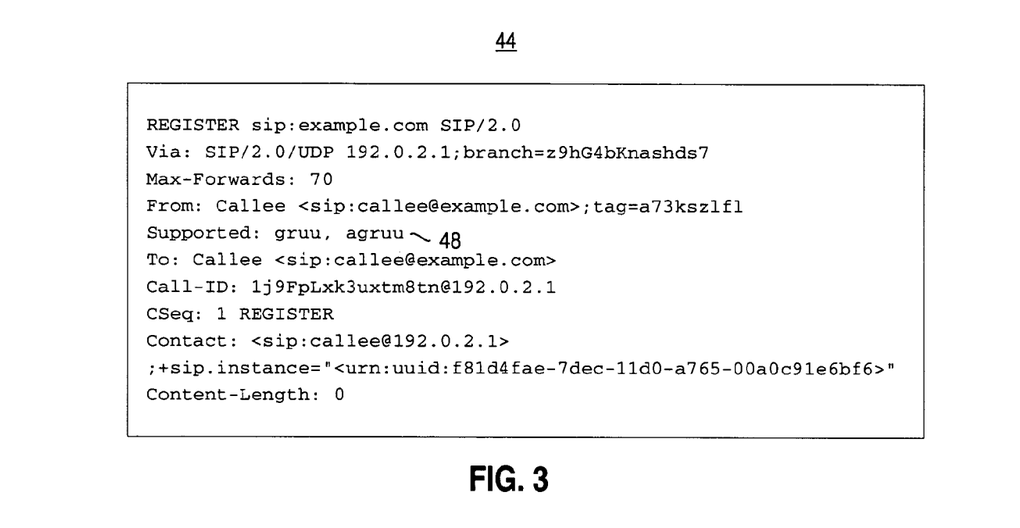
FIG. 3 illustrates an exemplary register request message generated pursuant to operation of an embodiment of the present invention.

FIG. 3 illustrates an exemplary register request 44. While various of the fields are formatted and populated with values that are conventional, the register request includes a supported field that is populated, together with an indication that the user agent further supports AGRUU. Here, the supported field includes such an AGRUU indication 48. That is to say, when a SIP user agent registers with the network, the registration is, in the exemplary implementation, as defined in the draft-IETF-SIP-GRUU-07, and includes the indication that the user agent wants assignment of a GRUU by providing a unique instance ID in the "sip.instance=" media tag in the contact header part of the message and by including an option tag "GRUU" in the supported header field in the request. And, as indicated by the "AGRUU" 48, the user agent indicates that it supports anonymous GRUUs by also including the option tag "AGRUU" in the supported header field. Another value could be used to indicate support for AGRUU.

The SIP registrar 22-1 that supports anonymous GRUUs, upon receiving the SIP register request that contains the supported header containing the option tags "GRUU" and "AGRUU" or other indication that indicates a request for a AGRUU, generates both a public GRUU and an anonymous GRUU. The public GRUU is compliant with the GRUUs defined in the aforementioned draft-IETF-SIP-GRUU document. And, both the public GRUU and the anonymous GRUU are provided in the response.

Figure 4:
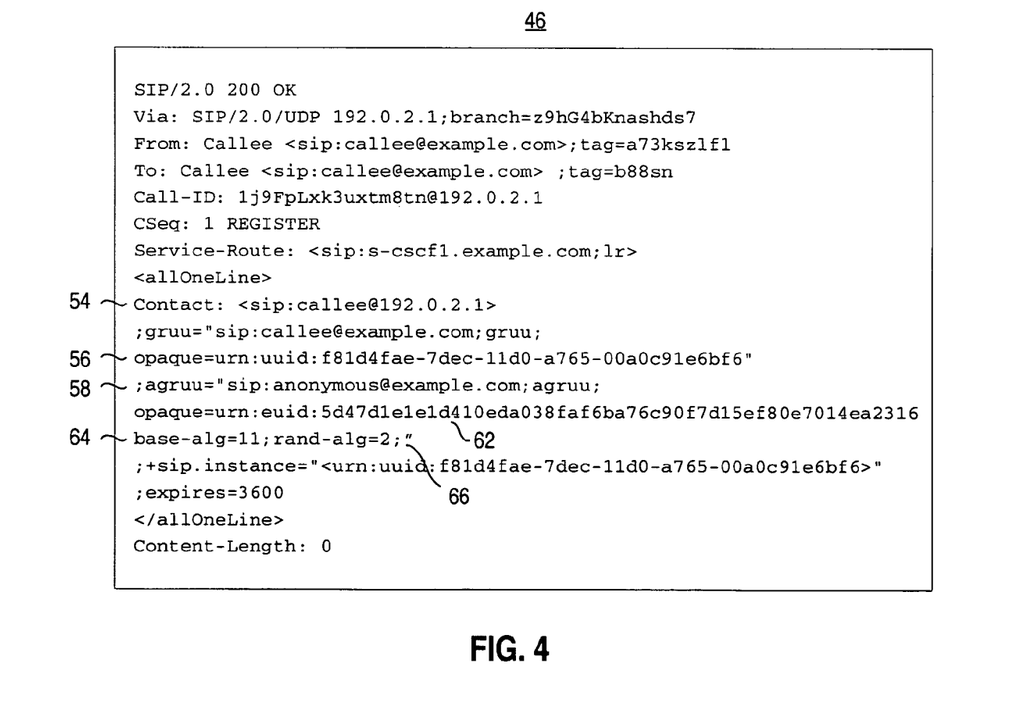
FIG. 4 illustrates an exemplary register response message generated pursuant to operation of an embodiment of the present invention.

FIG. 4 illustrates a representation of an exemplary 200 ok message 46 forming a register response message generated by the SIP registrar, or other network device. The message 46 is formatted generally in conformity with existing 200 ok message formats and includes a contact field 54. Here, the contact field is populated with an opaque value 56, an AGRUU value 58, an encrypted UID (EUID) value 62, a base algorithm value 64, and a RAND algorithm value 66.

The anonymous GRUU 58 contains an NAI (network address identifier) that is anonymous, or encrypted, and an opaque parameter that is encrypted using an encryption algorithm such as the randomizer algorithm (RAND-ALG) 60, shown in FIG. 2. When decrypted, the encrypted opaque parameter value returns the value of the opaque parameter of the corresponding public GRUU and, selectably also, an identifier usable by the network node devices issuing the GRUU to locate the registrar that issued the GRUU or as an index to locate the stored contact associated with the GRUU. The encrypted opaque parameter is a URN of the format "EUID", (encrypted unique identifier), as shown at 62 in FIG. 4. The user portion of the network address identifier is also able to be encrypted by application of the same algorithm rather than, as shown, using a fixed string, such as "anonymous".

A service route, such as that defined in the RFC 3608, is also returned, indicated in FIG. 4 as service-route, and includes the address of a node. The node that is identified in the service-route field is a node that is capable of decrypting the GRUU and resolving the GRUU. In order for an anonymous GRUU to work with dialog-ID verification, requests with an anonymous GRUU in the contact for which the dialog-ID verification is required includes the URI received in the service-route field in the route set of an outgoing initial request, such as an invite message.

The base algorithm 64 that is returned in the message 46 identifies the algorithm used by the registrar to generate the encrypted opaque parameter value. The specifics of this algorithm are not necessarily understood by the user agent to which the message is sent. The tag that is returned to the user agent is provided to the user agent to permit the user agent to include the tag along with the GRUU in subsequent messages so that the home domain nodes are made aware of which algorithm had been used to encrypt the opaque value and, selectably also, to encrypt the user portions of the NAI. This inclusion permits the domain to use different algorithms and to change algorithms in the event, e.g., that an algorithm is compromised.

The RAND algorithm tag 66 that forms part of the contact header field identifies an encryption algorithm known to the user agent that can be used by the user agent further to randomize a received encrypted opaque value on a per call basis. Only the randomizer encryption algorithm is known to the user agent, and the corresponding decryption algorithm is known only to the network nodes in the domain that issues the GRUU. The randomizer encryption algorithm has two input parameters in addition to the seed of the encrypted opaque parameter value. These additional parameters comprise the "RAND" and the "dialog-ID" parameters. The "RAND" is a value, e.g., a random number used by the user agent when the user agent randomizes the encrypted opaque parameter of the GRUU. The dialog-ID is used in association with "RAND" to randomize the encrypted opaque parameter of the GRUU. The "dialog-ID" is an input that is used in association with the "RAND" to randomize the encrypted opaque parameter of the GRUU. The "dialog-ID" has specific semantics as, unless its value is zero, its value is derived from one of the parameters that identify the SIP dialog with the contact that contains the anonymous GRUU. In one implementation, the value is converted to a hexadecimal of the string of either the call-ID, the local-tag, or the remote-tag of the dialog depending on whether the anonymous GRUU belongs to an initiator of the dialog or by the recipient in the request that created it. Referring back to FIG. 2, the local tag is identified at 72, the call ID tag is represented at 74, and the remote tag is identified at 75.

Both the base algorithm and the randomizer algorithm have the properties of preserving the uniqueness of the input string within the domain. The random algorithm exhibits this property even though the input parameters "RAND" and "dialog-ID" as there must be a determination of in what manner to decrypt the encrypted result. The randomizer algorithms are obtainable by the user agent in any of various manners. In one implementation, for instance, the algorithms are encoded in the software, downloaded to the user agent using a secure provisioning mechanism. Alternately, the algorithms are included as an application on a UICC or SIM card of a mobile user agent or other removable memory. Or, the algorithms are included as an application on a peripheral plugged into the user agent, such as a USB-connected device. The encoding and storage of such algorithms at the user agent is preferably resistant to tampering and analysis.

If the user agent includes a contact containing an anonymous GRUU in a request that creates a dialog, and the user agent requires the GRUU to be valid nearly for the period of time that the dialog exists, then, in one implementation, the user agent includes the call-ID (x) or local-tag (x) of the dialog with the anonymous GRUU along with a grid parameter.

If the user agent includes a contact containing an anonymous GRUU in a response to a request that creates a dialog, and the user agent requires the GRUU to be valid merely for the period of time for which the dialog exists, then the user agent includes, in one implementation, the remote-tag of the dialog with the anonymous GRUU along with the grid parameter.

The grid tag comports, e.g., with that defined in the aforementioned draft-IETF-SIP-GRUU. The grid tag is a user agent-generated value, in the exemplary implementation, that allows the user agent to associate the GRUU when the GRUU is utilized. When an anonymous GRUU is used, the "grid" tag value is set to the value used for "RAND" to randomize the GRUU.

If the user agent does not require that the anonymous GRUU be valid only for a period of time during which the dialog exists, then the user agent only includes the "grid" tag in the contact header, and the user agent does not include a call-ID, local-tag, or remote-tag. In this scenario, the value used for the dialog-ID, when randomizing the GRUU is zero, and no check is performed to see if the anonymous GRUU corresponds to an existing dialog involving the user agent that is assigned the decrypted GRUU.

When another user agent receives a request, or response, with a contact header that contains the anonymous GRUU, the other user agent is able to include the anonymous GRUU in the request-URI of a request in order to reach the user agent that included the anonymous GRUU. In one implementation, this is carried out using a mechanism analogous to that defined in the aforementioned draft IETF-SIP-GRUU-07 and does not require that the receiver of the anonymous request understand the anonymous GRUU extension.

A user agent that sends a request containing an anonymous GRUU in the contact header field includes in the request a route header containing the URI that is returned in the service-route header of the 200 ok message sent in response to a register request. The URI is a proxy that, when it receives the request and sees that there is an anonymous GRUU in the contact containing a "call-ID" or "local-tag" parameter, a record-route header is included in the forwarded request to ensure that it is on the route of all of the subsequent request for that dialog in order that it be able to verify that the dialog exists if the GRUU is used in the request-URI by another user agent.

If the anonymous GRUUs are supported by a domain, then all of the incoming requests must be record-routed by a proxy also for the reason that, likewise, a request containing an anonymous GRUU with a "remote-tag" in the request-URI can be verified against the state of the dialog.

When a request containing an anonymous GRUU, identified by the "AGRUU" tag or other tag, is received by a proxy at the domain that owns the GRUU, shown in the figures as example.com, the proxy uses the "RAND-ALG" tag to identify the randomizer algorithm used by the user agent to randomize the GRUU and then apply the algorithm to the value of the opaque parameter. Values are used from the "grid" tag and, if present, the "call-ID" or "remote-tag", or "local-tag" tag values with the anonymous GRUU. If only the "grid" tag is present, then a value of 0 is used for the dialog-ID parameter of the algorithm. Once the result is obtained, the result is provided to an algorithm identified by the "BASE-ALG" to return the value of the opaque parameter of the corresponding public GRU and also either the identifier to locate the registrar that issued the GRUU or the index to locate the stored contact associated with the GRUU. Depending on what is returned, the proxy forwards the request to the proxy that acts as the registrar that issued the GRUU or some other proxy that is able to match the contact. The proxy, in one implementation, when forwarding the request, uses the decrypted public GRUU opaque parameter in order to avoid additional decryption by the second proxy.

If a "call-ID" (74), "remote-tag" (75), or "local-tag" (72) is included in the anonymous GRUU, the request is routed by way of a network node device that has a dialog state for the dialog parameter that is included in the request. The network device comprises a proxy that record-routes the original request containing the anonymous GRUU in the contact header field. The proxy formed of the network device checks that the dialog still exists and then routes it to the registered contact of the user agent using procedures set forth in the aforementioned draft-IETF-SIP-GRUU-07.

In a further aspect of the present invention, the user part of the NAI of the anonymous GRUU is further encrypted and randomized. When encrypted and randomized, decryption permits proxies to resolve the NAI of the anonymous GRUU to the NAI (network asserted ID) of the public GRUU. Proxy handling is simplified as a proxy need not store and look up the public GRUU NAI based upon an opaque parameter value.

Figure 5:
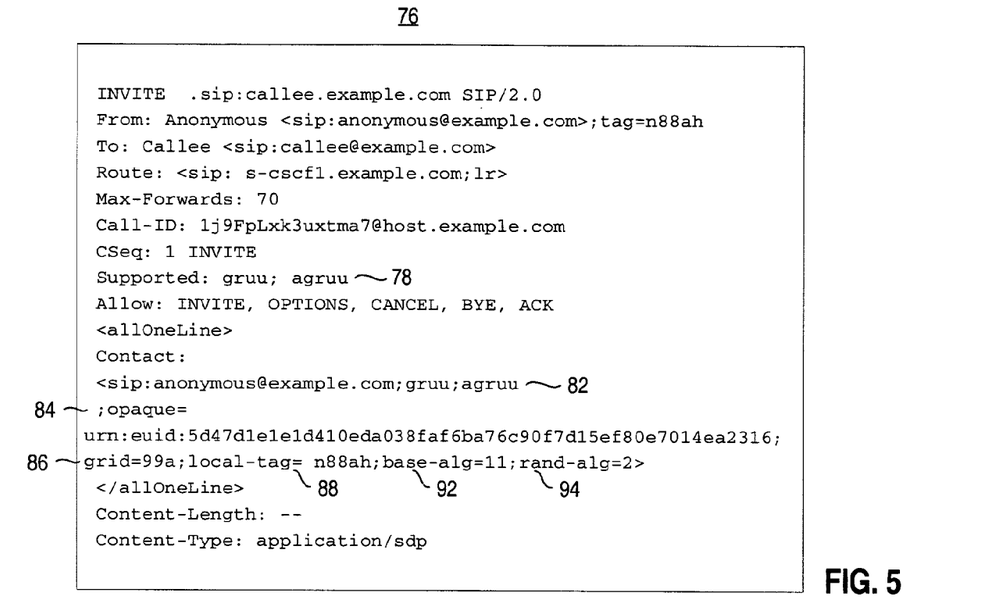
FIG. 5 illustrates an exemplary invite message generated pursuant to operation of an embodiment of the present invention.

FIG. 5 illustrates a representation of an exemplary invite request message generated by a message generator of a user agent, such as the message generator 32 of the user agent 12 shown in FIG. 1. The invite message 76 is also formatted in general conformity with the SIP message format protocols and here also includes a supported field. The supported field includes an AGRUU tag 78 or other tag that indicates support for anonymous GRUU. And, the invite message includes a contact field including the AGRUU 82, an opaque value 84, a grid value 86, a local-tag value 88, a base-algorithm value 92, and a randomizer algorithm 94.

Figure 6:
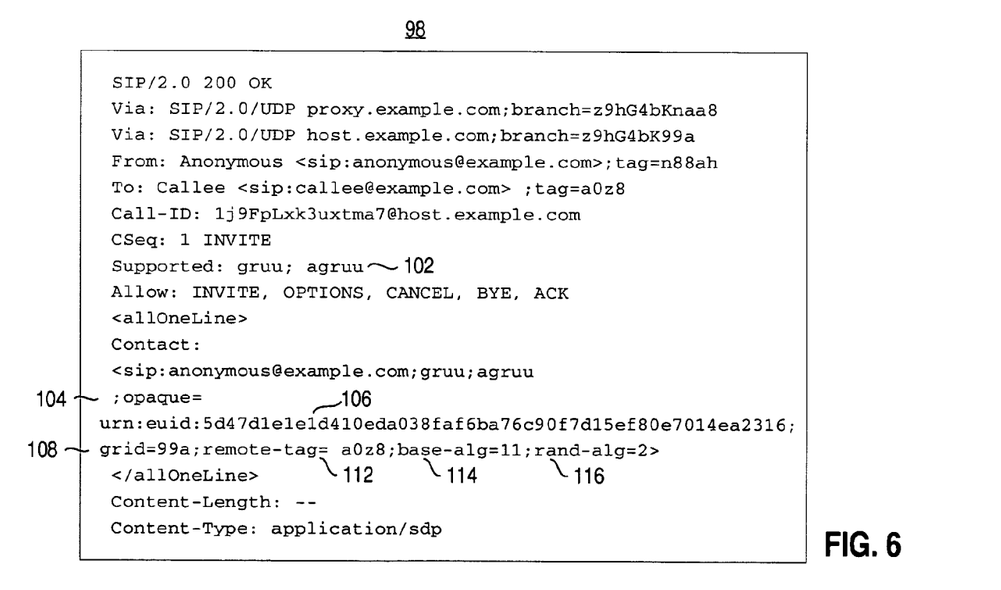
FIG. 6 illustrates an exemplary two-hundred okay message generated pursuant to operation of an embodiment of the present invention.

And, FIG. 6 illustrates a representation of another 200 ok response, again also formatted in general conformity with the SIP formatting protocols. Again, the supported field includes an AGRUU tag 102. And, the 200 ok message further includes a contact header field that includes an opaque value 104, an EUID value 106, a grid value 108, a remote tag 112, a base algorithm 114, and a randomizer algorithm 116.

Figure 7:
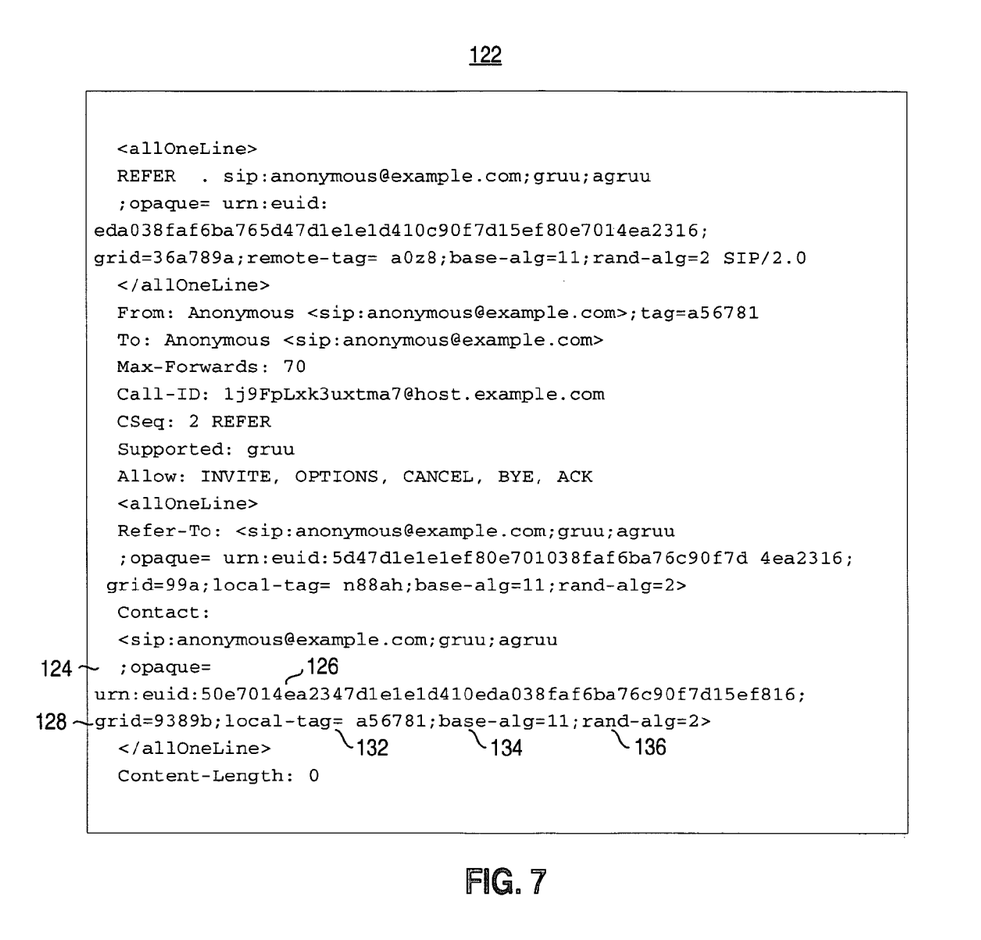
FIG. 7 illustrates an exemplary refer message generated pursuant to operation of an embodiment of the present invention.

FIG. 7 illustrates a representation of a refer message also generated pursuant to operation of an embodiment of the present invention. Again, the refer message is constructed in general conformity with the operating protocols and formats conventionally used in SIP message generation and signaling.

Here, again, the message includes a contact header field including an opaque value 124, an EUID value 126, a grid value 128, a local tag value 132, a base algorithm value 134, and a randomizer algorithm 136.

Review of the refer message shows that, to the user agent to which a call is transferred, the identity of the other user agent is anonymous. Privacy of communications is therefore provided through the generation and reception of messages and methodology of operation of an embodiment of the present invention.

Figure 8:
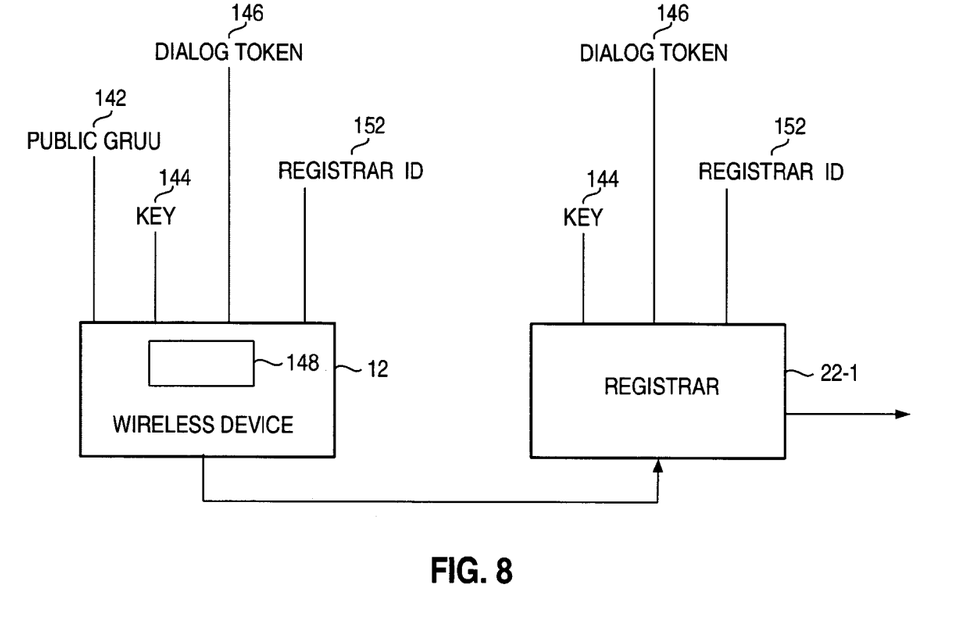
FIG. 8 illustrates a functional block diagram of entities used pursuant to an alternate embodiment of the present invention.

FIG. 8 illustrates a user agent 12, here forming a wireless device, and a SIP registrar 22-1 of an alternative embodiment of the present invention. The wireless device may also be a fixed device that contains a SIP UA. Here, the user agent operates without assignment by the SIP registrar of an anonymous GRUU. Here, instead, the user agent, pursuant to a registration request, merely requests assignation of a GRUU. And, a GRUU is provided, by the registrar to the user agent.

Subsequently, when a new SIP session is to be commenced, a determination will have been made that the identity of the user should be restricted and not be provided to another party, a B party. If such a determination has been made, then the GRUU that is sent is unique to the particular dialog. And, the GRUU is to be anonymous to the called party.

The public GRUU, here indicated at 142, available at the user agent 12, is taken and is encrypted with a key 144 that is known to the user agent and to the registrar 22-1. When the user agent forms a GSM/UMTS device, the key is formed, e.g., of one of the AKA keys available at the device. In addition, a dialog token 146 is also used to encrypt the GRUU 142 so that the resultant, encrypted value is valid for only that particular SIP dialog. The token forms, e.g., a call-ID, a remote-tag, or a local-tag. The operations performed upon the GRUU are carried out by an anonymiser 148. And, thereby, the value used to randomize the GRUU is known only at the user agent.

Subsequent to the encryption of the public GRUU, a registrar ID 152 is appended to either the user name part of the NAI or to the domain part of the NAI. The resultant NAI, a new NAI, is then used as the GRUU. And, the GRUU is constructed in the contact header.

Figure 9:
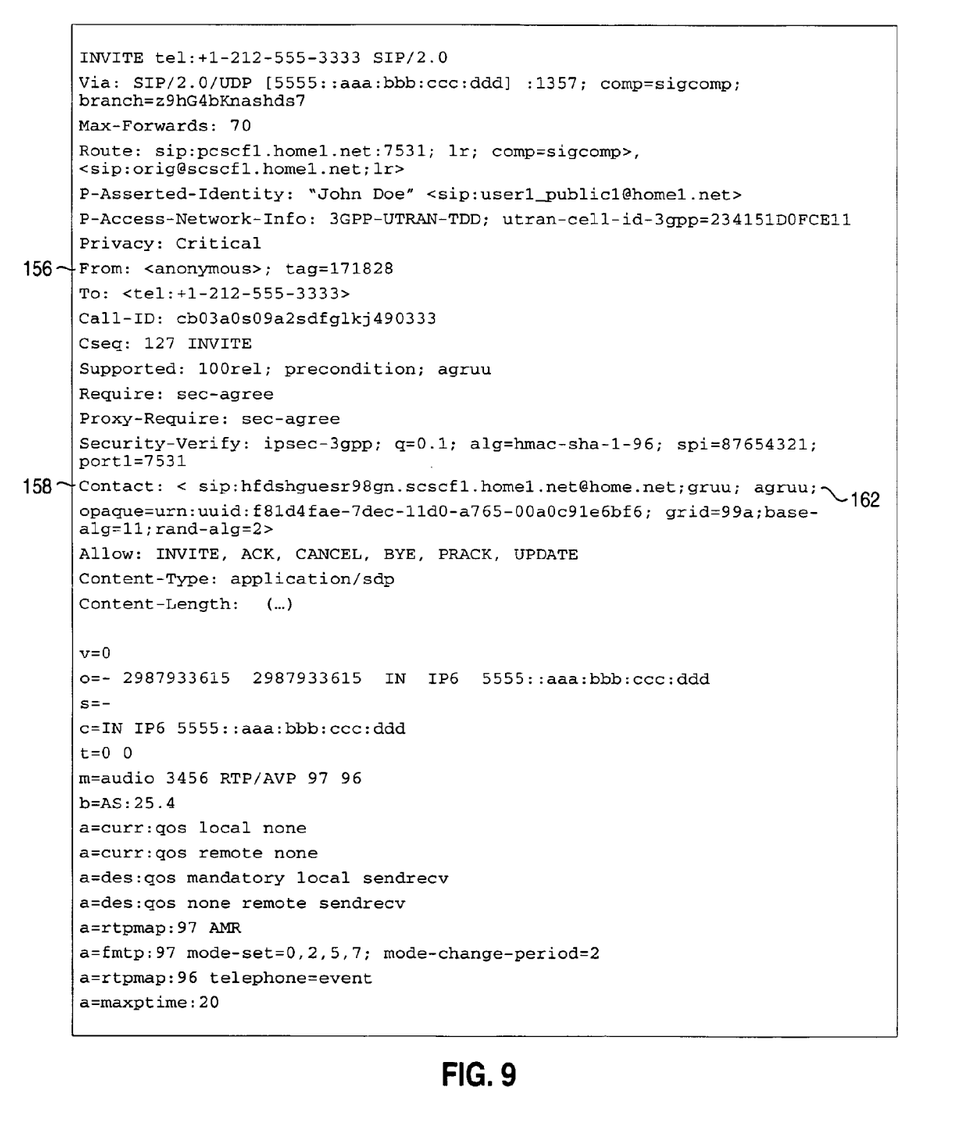
FIG. 9 illustrates an exemplary invite message generated pursuant to operation of an embodiment of the present invention.

FIG. 9 illustrates an exemplary invite message, represented generally at 156 that includes a contact header field 158 populated with a value 162, indicated to be an anonymous GRUU. In one implementation, the anonymous GRUU is a GRUU ID that is re-labeled as AGRUU for anonymous GRUU.

In other implementations, other variations of the contact header field value are used. For instance, home1.net@hfdshguesr98gn!scscf1.home1.net, hfdshguesr98gn@scscf1.home1.net, or various encrypted versions of such values are used where hfdshguesr98gn is the encrypted AOR that is only known at the SIP registrar and SIP UA.

Subsequent to sending and receipt at the SIP registrar of the SIP invite message, the registrar examines the SIP message and detects that the contact header identifies use of an anonymous GRUU. The registrar uses the key 144 that has been stored against the SIP user agent and the dialog token 146 to decrypt the GRUU. And, an association is created in its record, such as hfdshguesr98gn=user1_public1. And, then the SIP invite message is forwarded.

Additionally, upon receipt of the SIP message, the registrar 22-1 examines the SIP message. The registrar detects, from the requested URI, of the message that it is an anonymous GRUU. And, then, the registrar takes the user name part that is derived from the r-URI and locates the correct AOR at the instance identification.

Figure 10:
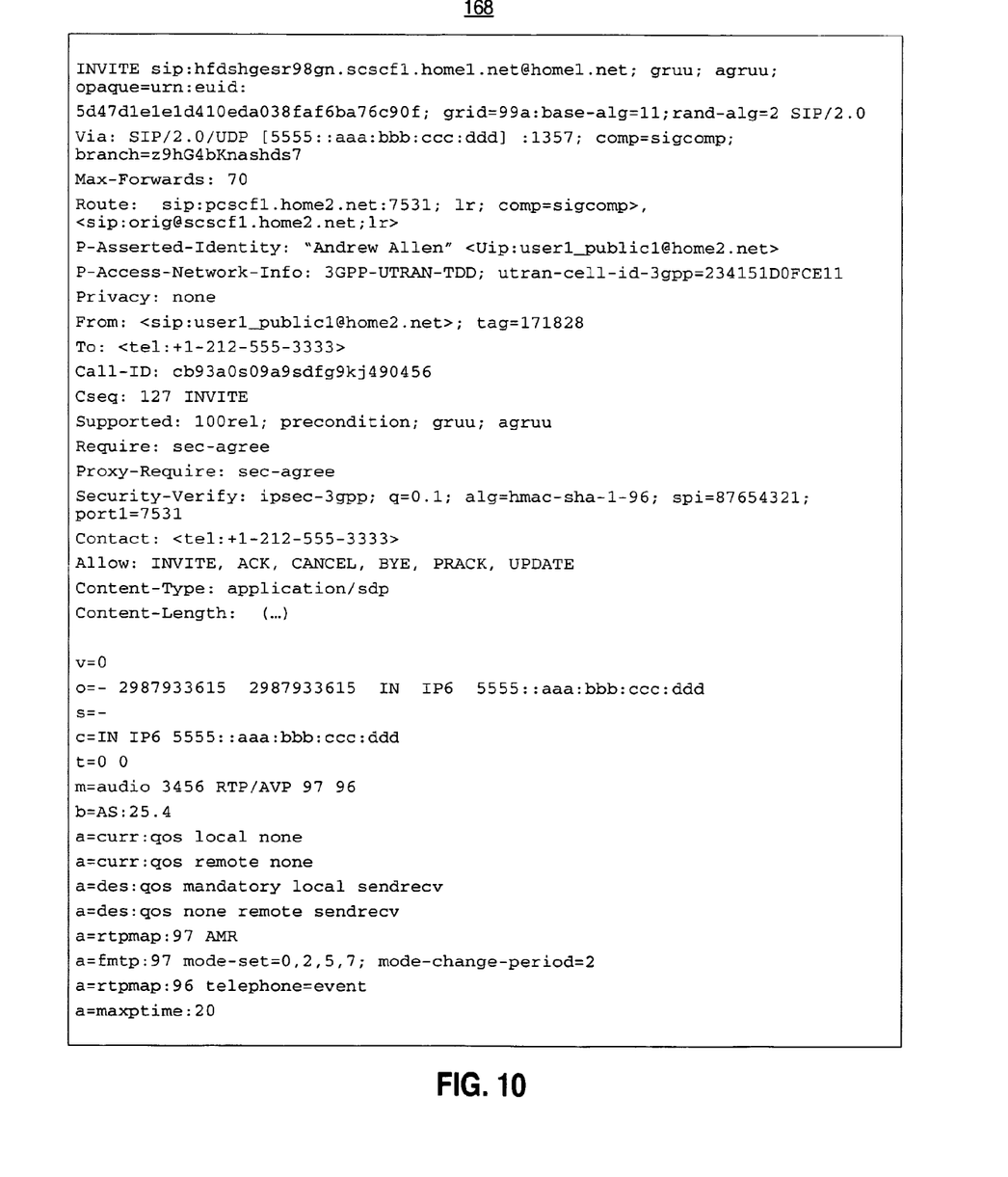
FIG. 10 illustrates a representation of another message generated pursuant to operation of an embodiment of the present invention.

FIG. 10 illustrates a representation, shown generally at 168, representative of the i-CSCF that receives an SIP message with the requested URI in any of the following formats.

<sip:hfdshguesr98gn.scscf1.home1.net@home1.net; gruu;agruu; opaque=urn:euid: 5d47d1e1e1d410eda038faf6ba76c90f; grid=99a>

<sip:home1.net@hfdshguesr98gn!scscf1.home1; gruu; agruu; opaque=urn:euid: 5d47d1e1e1d410eda038faf6ba76c90f; grid=99a>

<sip:hfdshguesr98gn@scscf1.home1.net; gruu;agruu; opaque=urn:euid: 5d47d1e1e1d410eda038faf6ba76c90f; grid=99a>

The values identify that an anonymous GRUU is being used. Then, the contact header is examined. Here, the user name part is examined, and the registrar ID is extracted. Rather than performing an HSS dip to find the registrar associated with the GRUU, the I-CSCF sends the SIP message directly to the registrar by mapping the registrar ID to the registrar.

Thereby, again, anonymity of the user agent is maintained. And, privacy of communications is better ensured.

The previous descriptions are of preferred examples for implementing the invention, and the scope of the invention should not necessarily be limited by this description. The scope of the present invention is defined by the following claims.

What is claimed is:

1. A wireless device comprising a user agent using a Session Initiation Protocol (SIP) for communication while maintaining anonymity of a user agent, said wireless device comprising:

a requestor configured to send a register request, the register request comprising a supported header field populated with a value indicating a request for a public globally routable user agent uniform resource identifier and for an anonymous globally routable user agent uniform request identifier; and a response detector configured to detect a response returned to the wireless device in response to the register request, the response comprising a public globally routable user agent uniform resource identifier and the anonymous globally routable user agent uniform resource identifier, wherein the response includes an indicator indicating which of the uniform resource identifiers (URIs) is the anonymous globally routable user agent uniform resource identifier.

2. The wireless device of claim 1 wherein the single anonymous globally routable user agent uniform resource identifier is included within a contact header field of said response.

3. The wireless device of claim 1 wherein the anonymous globally routable user agent resource identifier is a textual string of alphanumeric characters.

4. The wireless device of claim 3 wherein the textual string comprises a string "AGRUU".

5. The wireless device of claim 1 wherein the anonymous globally routable user agent uniform resource identifier is in the form of a network access identifier (NAI).

6. The wireless device of claim 1, further comprising a SIP message generator configured to generate a SIP message comprising a received anonymous globally routable user agent uniform resource identifier.

7. The wireless device of claim 6 wherein the SIP message comprises a SIP request.

8. The wireless device of claim 7 wherein the SIP request comprises a SIP invite request message.

9. The wireless device of claim 7 wherein the SIP request comprises a SIP refer message.

10. The wireless device of claim 6 wherein the SIP message comprises a SIP response.

11. The wireless device of claim 6, wherein the received anonymous globally routable user agent uniform resource identifier is included in a contact header field of said SIP message.

12. The wireless device of claim 1, wherein the anonymous globally routable user agent uniform resource identifier comprises a user name part and a domain part.

13. The wireless device of claim 12, wherein the user name part is encrypted and comprises part of the single anonymous globally routable user agent uniform resource identifier.

14. The wireless device of claim 12, wherein the user name part is anonymous and comprises part of the anonymous globally routable user agent uniform resource identifier.

15. A method for facilitating a Session Initiation Protocol (SIP) communication, while maintaining anonymity of a user, by a wireless device comprising a SIP user agent, said method comprising:
   sending from the wireless device a request to a SIP Registrar comprising a supported header field populated with a value indicating a request for a public globally routable user agent uniform resource identifier and an anonymous globally routable user agent uniform resource identifier; and
   receiving at the wireless device a response comprising the public globally routable user agent resource identifier and the anonymous globally routable user agent uniform resource identifier wherein the response includes an indicator indicating which of the uniform resource identifiers (URIs) is the anonymous globally routable user agent uniform resource identifier.

16. The method of claim 15 wherein the anonymous globally routable user agent uniform resource identifier is included within a contact header field of said response.

17. The method of claims 15 wherein the anonymous globally routable user agent resource identifier is a textual string of alphanumeric characters.

18. The method of claim 17 wherein the textual string comprises a string "AGRUU".

19. The method of claim 15 wherein the anonymous globally routable user agent uniform resource identifier is in the form of a network access identifier (NAI).

20. The method of claim 15, further comprising generating a SIP message comprising a received anonymous globally routable user agent uniform resource identifier.

21. The method of claim 20 wherein the SIP message comprises a SIP request.

22. The method of claim 21 wherein the SIP request comprises a SIP invite request message.

23. The method of claim 21 wherein the SIP request comprises a SIP refer message.

24. The method of claim 20 wherein the SIP message comprises a SIP response.

25. The method of claim 20, wherein the received anonymous globally routable user agent uniform resource identifier is included in a contact header field of said SIP message.

26. The method of claim 15, wherein the anonymous globally routable user agent uniform resource identifier comprises a user name part and a domain part.

27. The method of claim 26, wherein the user name part is encrypted and comprises part of the anonymous globally routable user agent uniform resource identifier.

28. The method of claim 26, wherein the user name part is anonymous and comprises part of the anonymous globally routable user agent uniform resource identifier.

29. Apparatus for a network node comprising a Session Initiation Protocol (SIP) Registrar to facilitate SIP communication of a wireless device while maintaining anonymity, said apparatus comprising:
   a first network node element comprising a register request detector configured to receive a request comprising a register request populated with a value indicating a request for a public globally routable user agent uniform resource identifier and an anonymous globally routable user agent uniform resource identifier; and
   a second network node element comprising a registrar response sender configured to send a response comprising the public globally routable user agent uniform resource identifier and the anonymous globally routable uniform resource identifier, wherein the response includes an indicator indicating which of the uniform resource identifiers (URIs) is the anonymous globally routable user agent user resource identifier.

30. The Apparatus of claim 29 wherein the anonymous globally routable user agent uniform resource identifier is included within a contact header field of said response.

31. The Apparatus of claim 29 wherein the anonymous globally routable user agent resource identifier is a textual string of alphanumeric characters.

32. The Apparatus of claim 31 wherein the textual string comprises a string "AGRUU".

33. The Apparatus of claim 29 wherein the anonymous globally routable user agent uniform resource identifier is in the form of a network access identifier (NAI).

34. A method for a network node comprising a Session Initiation Protocol (SIP) Registrar to facilitate SIP communication of a wireless device while maintaining anonymity of the user, the method comprising:
   receiving at the network node a register request comprising a supported header field populated with a value indicating a request for a public globally routable user agent uniform resource identifier and an anonymous globally routable user agent uniform resource identifier; and
   sending a register response to the wireless device, the register response comprising the public globally routable user agent uniform resource identifier and the anonymous globally routable user agent uniform resource identifier, wherein the response includes an indicator indicating which of the uniform resource identifiers (URIs) is the anonymous globally routable user agent uniform resource identifier.

35. The method of claim 34 wherein the anonymous globally routable user agent uniform resource identifier is included within a contact header field of said response.

36. The method of claims 34 wherein the anonymous globally routable user agent resource identifier is a textual string of alphanumeric characters.

37. The method of claim 36 wherein the textual string comprises a string "AGRUU".

38. The method of claim 34 wherein the anonymous globally routable user agent uniform resource identifier is in the form of a network access identifier (NAI).

* * * * *